United States Patent

Halasz

[15] 3,672,131

[45] June 27, 1972

[54] STATIONARY PHASE FOR SELECTIVE SORPTION

[72] Inventor: Istvan Halasz, Frankfurt am Main, Germany

[22] Filed: Jan. 15, 1970

[21] Appl. No.: 3,054

[52] U.S. Cl..............................................................55/386
[51] Int. Cl...........................................................B01d 15/08
[58] Field of Search........................55/67, 197, 386; 73/23.1; 210/31 C, 198 C

[56] References Cited

UNITED STATES PATENTS 2,657,149   10/1953   Iler......................................117/118 X
3,116,161   12/1963   Purnell....................................55/67 X

OTHER PUBLICATIONS

Gas Chromatography Abstracts 1960, Number 772, Page 129, Rossi et al.

*Primary Examiner*—J. L. Decesare
*Attorney*—Robert W. Carlson

[57] ABSTRACT

Stationary phases for chromatographic ion exchange or catalysis produced by esterification of solid substances having acidic OH groups at the surface as Components I with organic compounds as Components II. The specific surface area of Components I is above 100 cm²/g and Components II each have at least one hetero atom in their molecules, disregarding the oxygen connected to a carbon atom in the molecule for esterification with the acid OH group in Component I. By hetero-atoms is meant an atom other than carbon and hydrogen.

16 Claims, 9 Drawing Figures

STATIONARY PHASE FOR SELECTIVE SORPTION

The invention relates to a stationary phase, for chromatography, ion exchange, catalysis and similar processes based on sorption, i.e., absorption and desorption.

The problems arising in connection with the use of such stationary phases are usually due to the fact that a non-stationary phase, such as a stream flowing past the stationary phase, should advance step wise by alternately acting sorption processes involving action between the stationary and non-stationary phases.

An especially easily understood example of such a usage of a stationAry phase is in chromatography. Here the object is not only measurement but also to separate mixtures of blended materials in gaseous or liquid form. A partitioning or separating column is used for this which has a stream of carrier medium flowing through it and into which a small slug of the mixture to be separated into its component parts is injected. The inner walling of an open tube is coated with a film of a stationary phase, which by alternate adsorption and desorption undergoes action with the molecules of the mixture under study. Instead of the film being on the tube inner walls, the film can also be formed on particles introduced into the tube and the carrier medium flow around the coated particles, or a filling of particles may constitute the stationary phase.

The several components of the mixture, owing to their characteristic sorption properties remain inside the partitioning column for corresponding characteristic periods of time and leave the column at different points in time. Because of the temporary partitioning of the components, their determination can be effected by means of non-specific detectors, for example, one operating according to heat conductivity or by a differential refractometer. An important aim for the separation of the several components is that those mixture portions which issue one after the other not over lap each other.

The requirement that the injected slugs should, as much as possible, not intermingle with one another after partitioning, thus retaining their lengths, stipulates different requirements on the stationary phase. An essential condition to be met is that the stationary phase should be as inert as possible with respect to the carrier medium and to the mixture to be separated, except, of course, for the purely sorption processes, since the mixture usually is separated in stages in the carrier medium.

A second requirement is that sorption processes, in both directions, reach equilibrium as quickly and as completely as possible. Otherwise, the slugs to issue, in other words the bands, would become longer and longer with greater lengths of partitioning column.

A third requirement is that in the alternate action between the sample molecules and the stationary phase results in no excessively strong bond between the two. If the combining force is too great, the sorption is practically irreversible or the temperature must be held undesirably high. If the combining force is too small, no extensive partitioning is obtained.

These requirements are fullfilled in principle best by solid stationary phases, which in the case of gas chromatography are also advantageous because they exhibit a negligible vapor pressure, that is, they pass over into the carrier medium only to an extra ordinarily small extent. The rate of mass transfer is relatively good with solid stationary phases especially if the surface area is very great.

Heretofore solid stationary phases could, nevertheless, be used only in very limited circumstances. Because of the varying conditions of use it was often felt that the suitable solid stationary phases were not fit for the desired mechanical and surface characteristics. It was annoying too, that the reproducability in production was not often adequate. Besides, it was found that the heat of adsorption was undesirably very great. Correspondingly, temperatures dictated must be undesirably high. Also the capacity was often too small.

For the lack of a sufficient number of suitable solid stationary phases heretofore, liquid stationary phases were therefore used. But in many cases a liquid is not suitable as a stationary phase because movement is one of its specific characteristics, and it can hence be classed as stationary only under special assumptions. A further disadvantage of liquid stationary phases in the case of chromatography is that the vapor pressure of the liquid phase determines the maximum operating temperature. The comparatively high vapor pressure of liquid stationary phases produces an extra high variation of the base line on a chromotographic chart in the case of temperature programmed separation during the separation or partitioning process. If the separation is used for separative research work, the high vapor pressure of the liquid is disturbing because this appears as contamination in the several fractions. In the case of liquid phases the mass transport is extraordinarily slow, and consequently the rate of separation is very much lower than that for solid stationary phases.

But there are also features of liquids as stationary phases recognizable as particularly harmful chromatography. One is that the sample, or mixture to be separated, and the carrier medium be similar while the sample should not dissolve in the carrier medium. When a liquid stationary phase is employed, the sample molecules and this stationary liquid phase must likewise be analogous since without this assumption sorption by a liquid phase will not be likely to occur. Hence the conclusion that the carrier medium and the stationary phase be analogous. But that means that the stationary phase is likely to dissolve in the carrier medium. These drawbacks could be minimized if the stationary phase is a solid body with functional groups on the surface corresponding to those of a liquid stationary phase, because then danger of solubility is extremely low. By judicial selection of these solid bodies the danger is essentially zero.

One way to produce a solid stationary phase for chromatography is suggested by C. Rossi et al., la Chimica a l'Industrie, Vol. 42, No. 7 page 724 (1960). This was used to separate a mixture of hydrocarbons having one through four carbon atoms by silica gel esterified with a mono-alcohol such as benzyl alcohol or lauryl alcohol. Other such alcohols were used for the esterification. Methods used were as by Iler and Pinkney, "Industrial and Engineering Chemistry" Vol. 39, page 1,379 (1947) and in U.S. Pat. No. 2,657,149. But in those examples of the prior art, the stationary phase was produced by the esterification of the OH group on the surface of silica gel always with an alcohol notably having a single hydroxyl group, and accordingly, only a single hetero carbon and also the molecular weight of the organic compound lay under about 300. The results obtained in the use for chromatography were not especially good.

In the employment of stationary phases for ion exchange and catalysis, the same conditions apply as in chromatography to a great extent, if not actually the same. For example, the stationary phase should not be degraded or damaged by the moving phase, the quality must be reproducable during production, and the mass transport of the stationary phase must be very large.

BRIEF DESCRIPTION OF THE INVENTION

The drawbacks of conventional solid stationary phases are minimized by the present invention. The stationary phases of the invention exhibit at critical points more favorable properties than do those of a conventional nature and permit a wide range adaptation to the demands of individual situations.

The invention had in common with the production of stationary phases of a conventional nature the esterification of solid compound (Component I) having an acidic OH group at its surface with an organic compound (Component II). The novelty of the invention lies in features that the solid Components I have a structure with a specific surface area greater than 100 $cm^2$ per gram, and that the Components II are organic compounds having at least one hetero-atom in the molecule, not counting the necessary atom for an ester linkage of Components I and II.

DESCRIPTION OF THE PREFERRED EMBODIMENTS OF THE INVENTION

Figure 1:
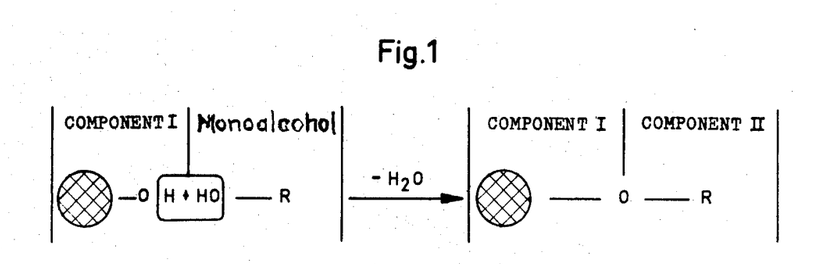
FIG. 1 symbolically shows a general reaction for the formation of a stationary phase.

In FIG. 1 at the left, the solid body Component I having an acidic OH group at the surface and a specific surface area of more than 100 cm$^2$/g is esterified by mono-alcohol R-OH to produce a compound having R bound to the body through an oxygen ester linkage. The radical R, according to the prior art, has no hetero-atom; i.e., it contains only carbon and hydrogen. According to the invention, R must contain a hetero-atom.

Figure 2:
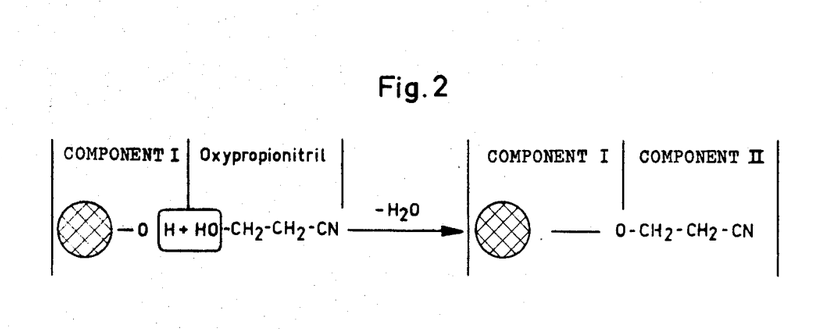
FIGS. 2 and 3 symbolically show specific reactions for the formation of a phase according to the invention.

In FIG. 2, the mono alcohol is one containing a hetero-atom N. Specifically the alcohol is oxypropionitril (HO-CH$_2$-CH$_2$-CN) also known as beta/hydroxypropionitril and the Component II, therefore, contains the hetero-atom N after esterification with Component I and the elimination of water.

Figure 3:
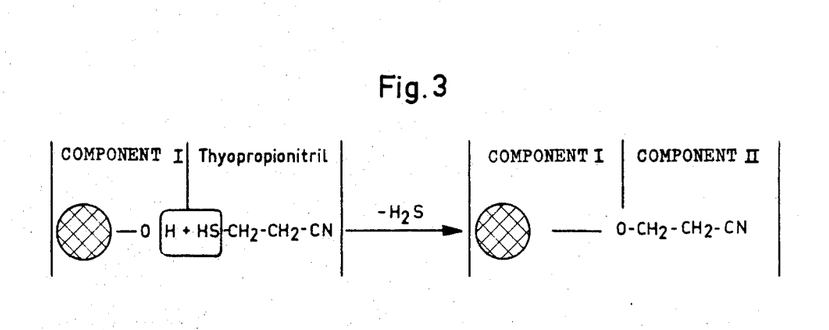

In FIG. 3 the same product is obtained as in FIG. 2, but the starting alcohol is a thio-alcohol rather than OH alcohol. Consequently H$_2$S is eliminated, during the esterification process, and not water as in FIG. 2.

The advantages of such novel stationary phases are that the chosen sorption characteristics can be systematically and simply produced by using an organic constituent that can be synthesized in a systematic way to produce those characteristics. The choice of the introduced hetero-atoms and the consequent possible variety in the composition of Component II facilitates the extraordinary variation and adaptation for sorption properties of the phase. An attendant advantage is that these stationary phases can be, and are, practically insoluble in moving phases such as the carrier medium and material to be separated, even if the moving and stationary phases are of generally similar nature.

Furthermore, it is easy to provide an organic constituent, i.e., Component II, of high molecular weight so that the capacity of the novel stationary phase is extraordinarily high. At the same time such novel stationary phases exhibit favorable properties without undue regard to differences in the components being absorbed.

The desired composition of the stationary phases according to the invention can be provided by observing a few fundamental rules. The stationary phase and the sample should be, as nearly as possible, chemically similar since the alternate adsorption and desorption then is generally extensive. Furthermore, in the separation of optical isomers the stationary phase should produce a uniform optical isomer fraction. Moreover, the immediate environment about the active positions of the stationary phase can be so made specially that only certain molecules of the mixture to be separated will have access to these positions. In many instances it is advantageous that the molecular weight of Component II be above 300.

In considering the material for Component I, inorganic substances are highly suitable. Inorganics which can be rendered suitable in the desired structure include various metal oxides, silica gel and glass. These can be obtained in rather large particles, greater than 20 micrometers which have a porosity to give the necessary specific surface area or very small particles can be supported on a suitable base by a binder or adhesive.

Compounds suitable as Component II for esterification with Component I provide the above mentioned hetero-atom. Typical of these compounds are dihydroxy or polyhydroxy alcohols, hydroxy aldehydes, acids containing an OH group or their derivitives, oxythioalcohols, organic compounds with SO$_2$ or SO$_3$ groups, oxamines or hydroxy amines, hydroxy amides, halogenated alcohols and organic compounds containing a metal ion, not counting an additional alcoholic group. Typical hetero-atoms are oxygen, nitrogen, sulfur, phosphorous and metals.

The invention is useful not only for stationary phases for chromatography but for ion exchange and catalysis. In the case of catalysis, for example, the solid body serving as Component I with an OH group at the active surface may be esterified with metal organic compounds having at least one alcoholic group, and wherein the metal ion for example has the desired catalytic properties. By the incorporation of one or more functional groups in the vicinity of the metal ion the desired influence on the properties of the metal ion can be obtained.

In preparing the stationary phase it makes no difference whether in the preparation the Component II as such is combined with Component I or whether an intermediate material is used. As later described in one of the examples, the component I is first esterified with a mono alcohol which contains no hetero-atom and then the hetero-atom is introduced to produce the stationary phase of the invention.

Hence, the fact that the Component I is connected to a carbon atom of Component II after esterification distinguishes the invention from such known solid stationary phases as in the case where a solid body with an OH group at the surface is reacted with an organically substituted silcon halide. This type solid stationary phase is described by Abel et al., (J. Chromatog. Vol. 22, page 23, 1966). Here long chain parafins were attached and the chromatographs were not especially good. Stewart and Perry (J. Chromatog. Vol. 37, page 97, 1968) suggested similar procedures for liquid chromatography without giving examples.

Silanification has the fundamental objection in that working with silicon compounds is difficult and expensive while the resultant stationary phases are not very stable.

Shown below are several examples of the invention with results described. As especially suitable solid materials for Component I the following are cited.

1. Silica gel
2. Porous glass that is either porous throughout or which provides a porous structure only at the surface to a limited depth.
3. SiO$_2$ particles made from soluble silica and precipitated on a carrier or support and having OH groups at the surface. The carrier may be merely glass beads, ground ceramic material such as brick, as well as Sterchemol, Chromasorb and the like. The carrier substance was moistened with a solution of soluble silica one or more times, dried, consolidated, and washed with acid. According to the concentration of the SiO$_2$ silica solution as well as by the number of moisture processes, the desired number of free OH groups per unit or surface area can be regulated.
4. Glass beads of spheres or sand as carrier which were moistened with soluble silica in the nascent state were covered with SiO$_2$ powder such as aerosol, silica, silica gel, having OH groups at the surface and dried, after which it was washed with acid and water and dried. Also glass spheres or sand can be mixed with a paste or pulp of soluble silica and SiO$_2$ powder having surface OH groups, then dried and finally washed with acid and water and dried.

In both the next above instances the soluble silica served mainly as a binder.

5. Active metal oxides having acidic OH groups such as aluminum and iron oxides.

6. Glass, sand, or metal oxides which are given, or enriched in, an OH group under the influence of water in an autoclave at quite high temperatures say, 3,000° C. and at corresponding water vapor pressures.
7. Sand digested with sulfuric or hydrochloric acid at high temperature to produce surface active OH groups or silanol groups.

The organic Components II may be an organic alcohol having, besides one alcoholic OH group, at least one additional hetero-atom such as nitrogen, oxygen sulfur, metal ions etc, as have already been mentioned.

As previously mentioned, one or more hetero-atoms may be introduced after esterification. For example, silica gel was first esterified in conventional manner with benzyl alcohol and the ester was then sulfonated.

According to the invention, after esterification, the organic portion of the stationary phase, i.e., Component II may also be modified if an alcohol containing a reactive group such as OH, halogen, -$NH_2$, -CHO, or a multibond carbon-to-carbon linkage, is used for esterification.

It is often advantageous if esterification is done in an inert atmosphere, as under a blanket of nitrogen or argon. This is especially true if Component II is easily oxydized.

Furthermore, polymerization or condensation after esterification is often beneficial. This can be done by the use of suitable catalysts for the polymerization and it enhances the capacity of the stationary phase.

Finally, if the compound used for esterification contains no hetero-atom, the latter may be introduced into Component II by polymerization.

Specific examples for preparing the stationary phases are as follows:

EXAMPLE 1

100g silica gel having a specific surface area of 300 $m^2/g$ and sieve fraction of 100 to 120 micrometers (mu) is dried from under vacuum or atmospheric pressure from 8 to 20 hours between 110° and 1,000° C. The quality of the surface depends on the manner of this preliminary treatment. 500 g polyethyleneglycol (PEG) of about 20,000 molecular weight is heated to 200° C. after which the silica gel is added and the mixture cooked at between 190° and 200° C. from 1 to 2 hours with constant stirring. After cooking this mixture, excess PEG is removed by washing with methylene chloride at room temperature. The esterified silica gel is filtered off and subjected to soxhlet extraction with methylene chloride about 10 hours. Thereafter the solid ester is dried under vacuum at from 100° to 150° C. This product was then used to fill a chromatographic column. The product contained about 20 percent by weight chemically combined PEG.

EXAMPLE 2

100 g porous glass with a specific surface area of about 50 $m^2/g$ and sieve fraction of 70 to 100 m$\mu$ is digested with 1:1 dilute sulfuric acid from 1 to 2 hours and thereafter water washed to neutrality and dried as in Example 1. 300g hydroxypropionitril is heated to 190° C. and the dried glass added and the mixture esterified, purified and dried as in Example 1.

EXAMPLE 3

Glass spheres from a sieve fraction of 100 to 120 $\mu$ are digested with concentrated sulfuric acid and washed generally as in Example 2, after which they are dried at 120° C. Soluble silica solution of 30 percent silica and 0.3% $Na_2O$ by weight was diluted 1:1 with ethanol. 100 g prepared glass spheres are mixed with the soluble silica mixture, well-stirred a short time and then filtered off. The coated spheres are allowed to stand 2 hours at room temperature exposed to air, after which they are dried at 150° C. The coating process can be repeated in order to increase the number of silica particles on the surface.

The coated and dried spheres were digested with 1:1 diluted sulfuric acid for 1 hour. After filtration the product was washed to neutrality with water and dried at 110° to 300° C. The spheres were then esterified with 20,000 mol. wt. polyethyleneglycol, washed, extracted and dried as in Example 1.

EXAMPLE 4

Kieselgur having a specific surface area of about 5 $m^2/g$ and a sieve fraction of 150–200 m$\mu$ was coated with soluble silica solution, washed and dried as in Example 3 for glass spheres. The product was esterified with gamma hydroxybutyramide (HO-$(CH_2)_3$-$CONH_2$) at 200° C. and subsequently washed and subjected to extraction with dioxon. The product was dried at 100° C. under vacuum.

EXAMPLE 5

50 g soluble silica (30% $SiO_2$ and 0.3% $Na_2O$ by weight) was diluted with 50 ml ethanol. In this mixture 10g silica gel powder (particle size about 1 m$\mu$) were suspended by constant stirring. This suspension was well mixed with 50g Cromosorb (ground chamotte). After suitable filtration the solid product was allowed to stand in air at room temperature for 5 hours and then dried at 150° C. The dried product was esterified with HO-$(CH_2)$2-$NH_2$ at 180° to 200°, washed and dried as in Example 2. It should be noted that soluble silica is here used as a binder for the finely divided silica gel.

EXAMPLE 6

Chemically pure sea sand (Merck) was refluxed with 1:1 diluted hydrochloric acid for about 10 hours and then water washed to neutrality, then dried 12 hours at 200° C. The dried sand was then added to a sufficiently large amount of benzyl alcohol which had been heated to 195° C. After stirring the mixture for 2 hours at this temperature, it was cooled and decanted several times with methanol. The solid phase was then subjected to soxhlet extraction with the same solvent about 5 hours, and the finished product dried under vacuum at 100° C. Finally it was processed with oleum at 0° C. and then washed with a suitable solvent and later dried. The resulting product had ion exchange properties.

EXAMPLE 7

Aluminum hydroxide was heated at 200° C. under vacuum. Polyethyleneglycol-monostearate (mol wt. 400) was heated to 180° to 200° C. and the aluminum hydroxide added and stirred at this temperature for 2 hours. Further processing was as in Example 1.

EXAMPLE 8

Glass spheres were boiled with concentrated sulfuric acid 5 hours at about 260° C., washed until acid free, and then heated with water in an antoclave 24 hours at 300° C. The spheres were then added to 8-chloro-N-octanol at 190° to 200° C. and stirred about 2 hours at this temperature. The sediment was processed as in Example 1. The resulting parafinic ester had its chain lengthened by Wurtz synthesis using sodium and chlorobutanol, and this synthesis introduced the hetero-atom.

EXAMPLE 9

Sea sand was preliminarily treated as in Example 6 and then heated with allyl alcohol (b.p. 96° C.) in an autoclave at 190° C. and the residue processed as in Example 1. The allyl group of the product was then polymerized with the aid of a suitable catalyst (ethylene and propyleneoxide each are satisfactory) to introduce the hetero-atom.

The FIGS. 4 to 9 show the desirable characteristics of stationary phases made according to the invention.

Figure 4:
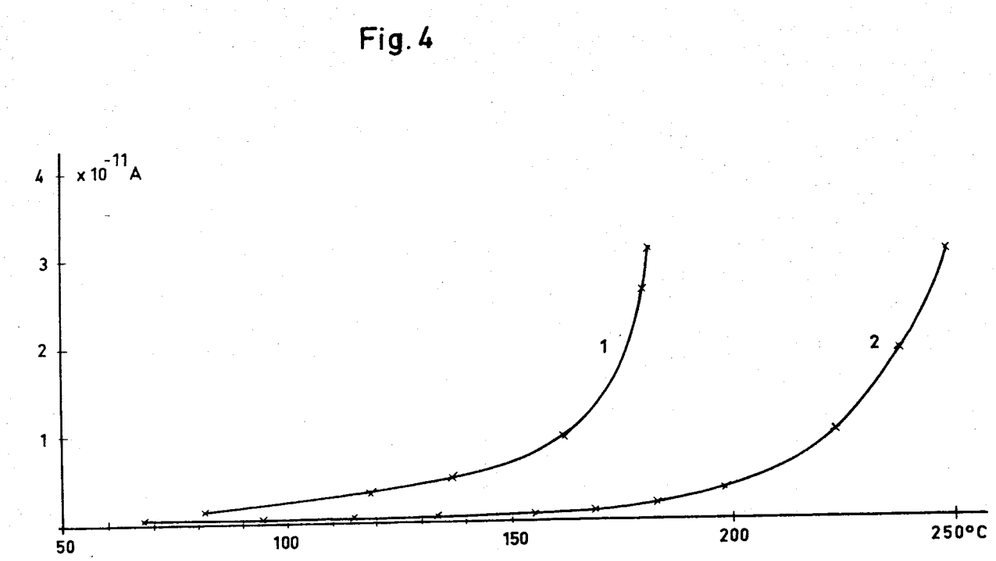
FIG. 4 shows comparison curves between two partitioning columns having differing compositions for the stationary phase.

FIG. 4 shows the relationship of vapor pressures of the phase against temperature. Curve 1 shows the relationship for the hitherto obtainable phases and curve 2 shows the relationship for a phase according to the invention. The ordinate indicates current by an ionization detector for operating temperatures of the column. In the comparative indications both columns were operated on the same carrier gas. The separation Column 1, by which the values for curve 1 were measured, consisted of a tube with an internal diameter of 4 mm. filled with kieselgur having a sieve fraction of 100 to 120 micrometers which was wetted with 15 percent by weight polyethyleneglycol (mol wt. 20,000). Curve 2 was obtained from a column of the same measurements but filled with stationary phase material made from porous glass and polyethyleneglycol and produced according to Examples 2 and 3.

The output measurement by the ionization detector is proportional to the vapor or sublimation pressure of the stationary phase. It is to be noted in FIG. 4 that the ionization current, and therefore the vapor pressure of the stationary phase according to the invention, as shown by curve 2, is always essentially much smaller than that from prior art phases indicated by curve 1. Such curves and actual separation tests show that data from using the present stationary phases are reproducable within good limits.

Before discussion of FIGS. 5 to 9, reference to conventional evaluation of chromatographs is helpful. Conventionally a chromatograph beings with a time-reference start point at which a sample is injected into a carrier gas stream and time is plotted leftwardly with the output of a detector, such as an ionization detector, plotted as ordinate. An inert component of the sample, which does not interact with the stationary phase, may have an excursion time $t_o$. If one of the components is retarded and has an excursion time $t_R$ then the detention time in the stationary phase is $t'_R$ or $t_R - t_o$. The capacitance ratio is defined as $k' = t'_R/t_o$. Conventionally the number of theoretical plates $n = 16t_R^2/w$, where $w$ is the width of the bonds, i.e., the axial segment of the tangent at the points of curvature. Also the height equivalent of a theoretical plate $h = L/n$, where $L$ is the length of the column. The partitioning or separation speed of a column is measured by number of effective plates N or the height equivalent H whereby $N = n(k'/1+k')^2$ or $$H = h\left(\frac{1+k'}{k'}\right)$$

. The speed of analysis can be characterized as the number of theoretical plates with respect to time in seconds, i.e., $n/t$ or $N/t$.

Figure 5:
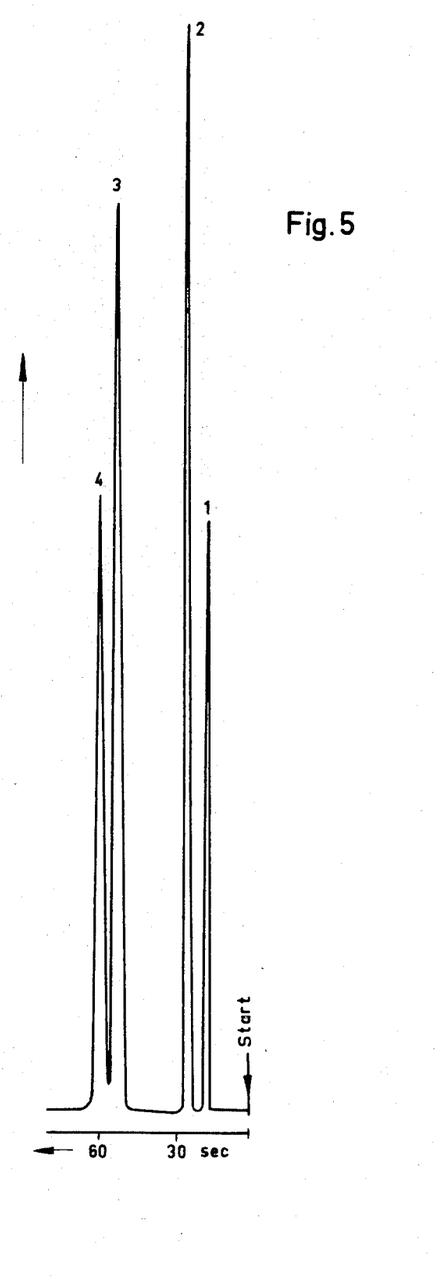
FIGS. 5 to 7 show gas chromatographs for stationary phases according to the invention.

FIG. 5 shows a chromatograph from a sample composed of the gases methane, ethane, propane and propylene represented by peak numbers 1, 2, 3 and 4 respectively. The chromatograph was obtained by a column 100 cm in length and 2 mm internal diameter filled with stationary phase material produced according to Example 2, from porous glass and hydroxy-propionitril. The product employed had a sieve fraction of $dp = 50$ to $75$ $\mu$ and the column operated at 28° C. Average linear speed of the nitrogen carrier gas was 6.3 cm/sec, and the separation was carried out in 60 seconds. Values for component 4, the propylene, obtained were: $k' = 2,9$ and $n = 2,500$ or $N = 1,380$. That corresponds to $n/t = 42$/sec or $N/t = 23$/sec. Thus, by use of the invention, an uncommonly high analysis speed is obtained. Conventionally packed columns have given at most $N/t = 0.5$ to 3/sec. The good symmetry of the peaks should be noted.

Figure 6:
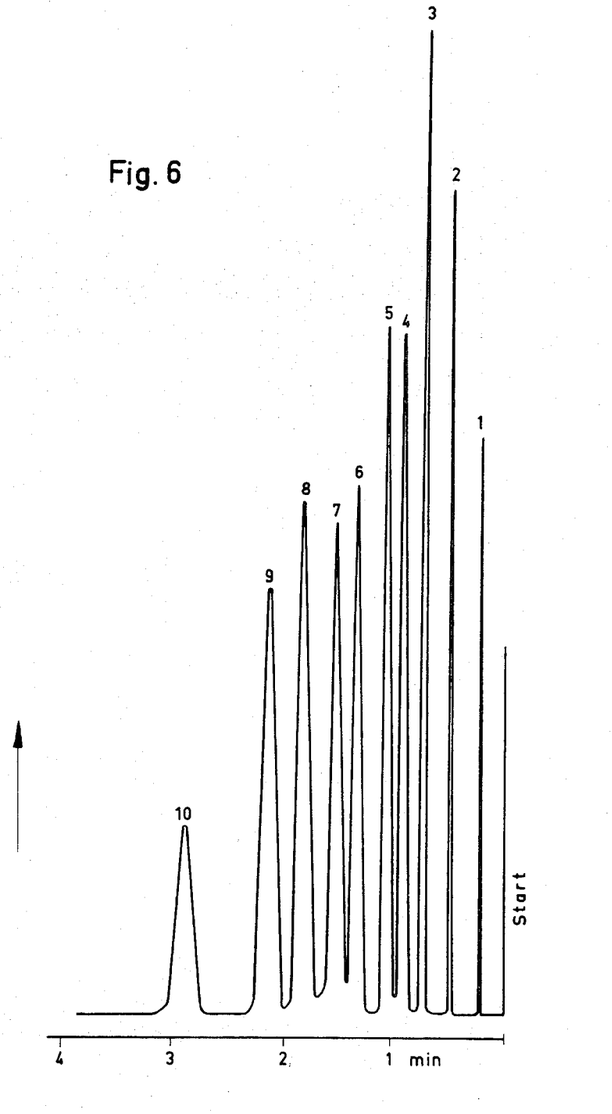

FIG. 6 shows fractionation by the same column at average carrier gas speed of 7.8 cm/sec at 121° C. of ten components:
1. Methane
2. n-Pentane
3. Cyclohexane
4. 2, 4 Dimethylpentane
5. Methycyclohexane
6. 2, 2, 4-Trimethylpentane
7. 2, 3, 4-Trimethylpentane
8. n-Octane
9. 2, 2, 5-Trimethylhexane
10. Diethylether In FIG. 6, as in FIG. 5, ordinates represent the current output of an ionization detector. The selectivity in separating isomeric components 6 and 7 is especially good.

Moreover in FIG. 6 it should be noted that the band of polar ethers (peak 10) at $k' = 12.4$ is unusually symetrical with $h = 0.46$ mm or $H = 0.53$ mm. Yet here values $n/t = 12.6$/sec or $N/t = 10.8$/sec were always obtained. In the case of peak 3, for cyclohexane, with $k' = 2.27$ materially greater analysis speeds were obtained, $n/t = 42.5$/sec. and $N/t = 20.3$/sec.

Figure 7:
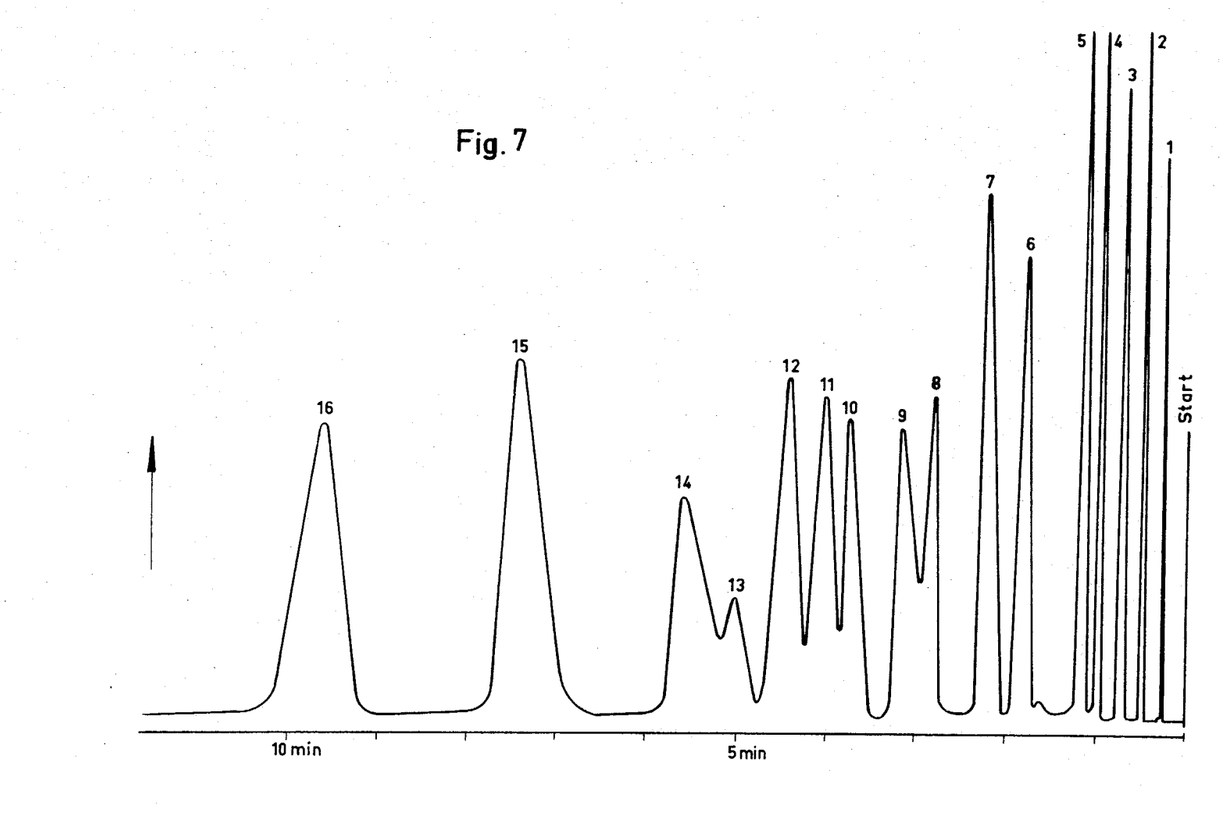

The column used in FIGS. 5 and 6 was also used for analysis in FIG. 7. The sample contained the following components:
1. Methane
2. n-Pentane
3. n-Hexane
4. Chloroform
5. Benzene
6. n-Octane
7. Toluene
8. Diethyl ether
9. n-Nonane
10. p-Xylene
12. o-Xylene
13. n-Decane
14. Acetone
15. Mesitylene
16. n-Undecane The symmetry of the bands in FIG. 7 and the extremely small $h$ and $H$ values with extraordinarily high $k'$ values is to be noted. For mesitylene $k' = 33$ and $h = 0.59$ mm while for n-undecane $k' = 43.5$ and $h = 0.53$ mm and also under the unfavorable circumstances $N/t$ were 3.6/sec and 3.2/sec respectively.

Figure 8:
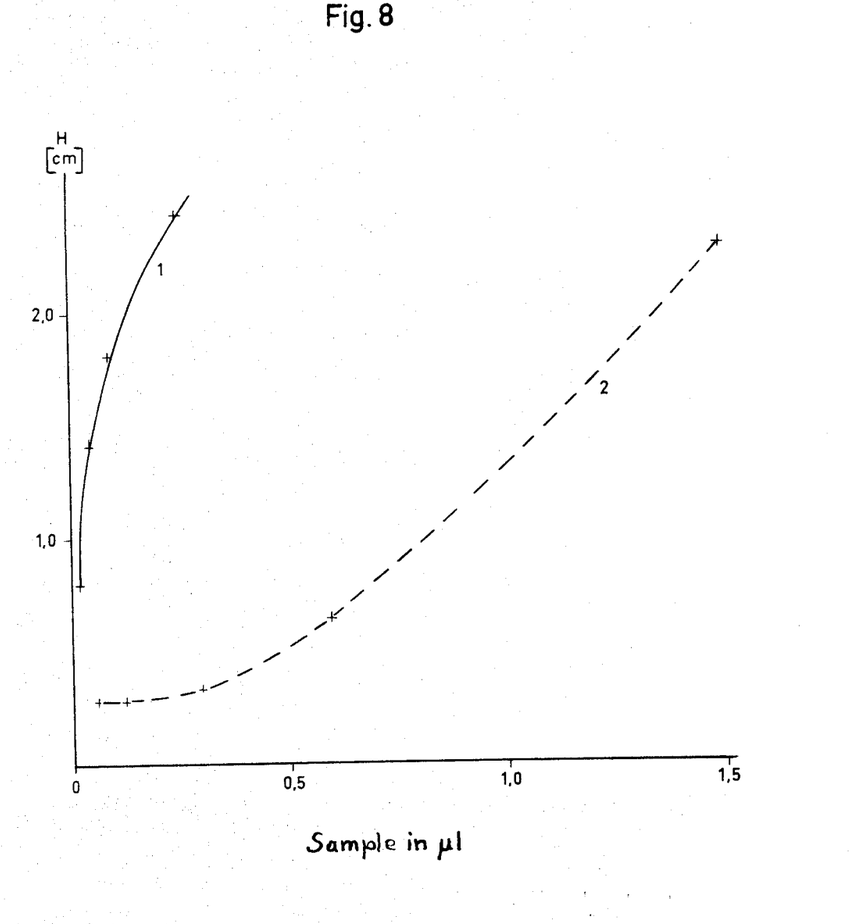
FIG. 8 shows curve indication the capacity of the novel phases.

The favorable capacitance of the present phase is shown in FIG. 8. In chromatography it is desirable that the otherwise fixed parameters allow the injection of comparitively large samples without great widening of the bands i.e., without greatly increasing the $H$ values and causing overlapping. Two columns are compared in FIG. 8 by curves 1 and 2, with $H$ values plotted against sample size in microliters of liquid. Both columns were 100 cm in length having an internal diameter of 2 mm. The column giving curve 1 was filled with kieselgur wetted with 15 percent by weight polyethyleneglycol,and that giving curve 2, with phasematerial prepared according to Example 1 from silica gel and polyethyleneglycol. Using n-heptane as sample and nitrogen as carrier gas at an average speed of 6.6 cm/sec, it is evident that the same H values can be had by using the phase of the invention when the sample size is several times larger than when a conventional stationary phase is used, thus showing the advantage of the invention. Under similar conditions when methylacetate, benzene, trichloroethylene and the like were used as the sample material, similarly running curves showed the greater capacitance of the stationary phase according to the invention.

All further data showed the invention to have very favorable properties. These favorable properties were evidenced by: A rapid analysis, symmetrical peaks and very low $h$ values, and extra ordinarily large $k'$ values, negligible vapor pressure and great capacitance.

Figure 9:
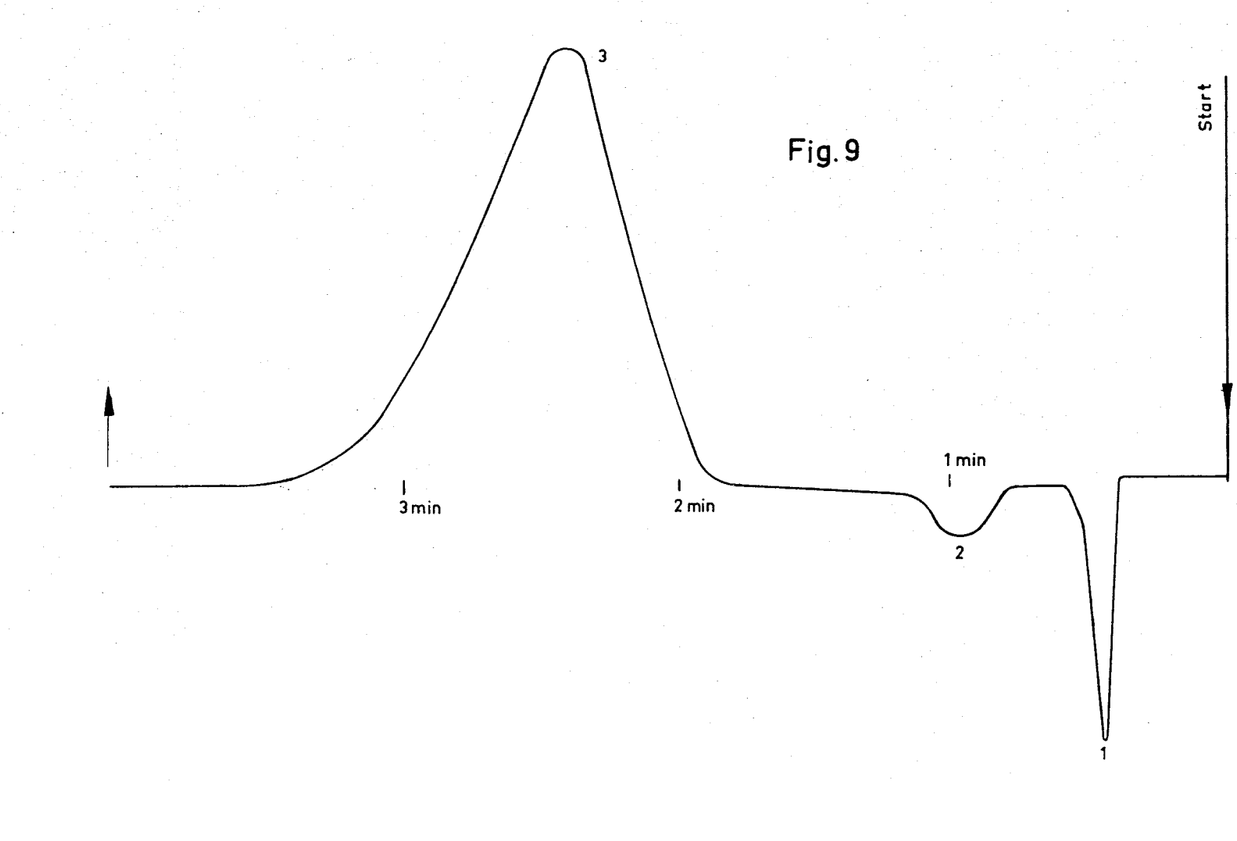
FIG. 9 shows a liquid chromatograph obtained by the invention.

FIG. 9 shows an example of properties when the invention is used for liquid chromatography wherein the sample and carrier medium are liquids. The results were obtained by using a separation column 40 cm in length and the inner diameter 3 mm. and packed with the same stationary phase material for the results shown in FIGS. 5, 6 and 7, and hence the sieve fraction was 50 to 75 $\mu$. The carrier liquid was n-heptane. The velocity of the carrier liquid was 1.4 cm/sec and the pressure drop across the column amounted to about 8 atmospheres. A differential refractometer was used as the detector. Within the limits of error of the refractometer, the measurements showed that no component of the stationary phase was dissolved in the moving phase. The established limit of sensitivity of the refractometer lay under 0.5 ppm hydroxypropionitril in heptane. The ordinate of the curve in FIG. 9 is the throw of the stylus of the recording differential refractometer.

The sample mixture for the curve of FIG. 9 consisted of n-pentane, which accordingly does not interact with the stationary phase, an unknown substance and anilin, indicated by the numbers 1, 2 and 3 respectively.

Although the column for FIG. 9 was very short and consequently the undesirable band widening beyond the packing was made worse, still anilin values of $k' = 3.9$; $n/t = 1.14$ and $N/t = 0.4$ were obtained. These speeds are comparable with the values obtained in gas chromatography and are quite uncommon in liquid chromatography.

As to the measurement data set forth herein it must be considered that none of the chromatographs shown in the drawings exhibit the most desirable characteristics in all respects but they do give a good comparison with the prior art in readily comparable circumstances. The shown data is therefore not to be taken as the best obtainable. For instance a change of operating temperature might affect data.

I claim

1. A stationary phase for chromatography, ion exchange, and catalysis consisting of an ester of a solid chemical compound having acidic OH groups at the surface thereof and an organic alcohol, the improvement characterized by the solid compound having a structure with a specific surface area greater than 100 cm² per gram, and the alcohol being selected from the group consisting of polyalcohols having a molecular weight greater than 110 and mono-alcohols having at least one hetero-atom selected from the group consisting of nitrogen, sulfur, phosphorous, metal atoms, and oxygen other than the atom providing the ester linkage between said solid compound and said alcohol, said hetero-atom being linked directly to a carbon atom in the alcohol.

2. A phase as claimed in claim 1, said solid compound being an inorganic compound.

3. A phase as claimed in claim 2, the inorganic compound being essentially silica gel.

4. A phase as claimed in claim 2, the inorganic compound being essentially porous glass.

5. A phase as claimed in claim 2, the inorganic compound being essentially $SiO_2$ particles having OH groups at the surface and the particles being adhered to a support.

6. A phase as claimed in claim 1, the hetero-atom being a nitrogen atom.

7. A phase as claimed in claim 1, the hetero-atom being a sulfur atom.

8. A phase as claimed in claim 1, the hetero-atom being a phosphorous atom.

9. A phase as claimed in claim 1, the hetero-atom being a metal atom.

10. A phase as claimed in claim 1, the alcohol having a molecular weight greater than 300.

11. A process for preparing the phase claimed in claim 2, wherein the inorganic compound is esterified with an alcohol selected from the group consisting of oxyalcohols and thioalcohols, said process comprising, heating the alcohol to at least 190° C. in the presence of the inorganic compound.

12. A process as claimed in claim 11, the alcohol being a hydroxy aldehyde.

13. A process as claimed in claim 11, the alcohols being monoalcohols, and then introducing said hetero-atom after esterification.

14. A process as claimed in claim 13, the introduction of the hetero-atom being by condensation.

15. A phase as claimed in claim 2, the alcohol containing a substiuent selected from the group consisting of halogen, sulfonic acid group, and hydroxyamino group.

16. A phase as claimed in claim 2, the inorganic compound being essentially a metal oxide.

* * * * *